(12) United States Patent
Bidulock et al.

(10) Patent No.: US 11,647,113 B2
(45) Date of Patent: *May 9, 2023

(54) SYSTEM AND METHOD FOR LIMITING INCOMING SPAM CALLS

(71) Applicant: TELUS Communications Inc., Vancouver (CA)

(72) Inventors: Brian F. G. Bidulock, Edmonton (CA); Gordon L. Hole, New Westminster (CA); Marvin J. Severson, Edmonton (CA)

(73) Assignee: TELUS Communications Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,346

(22) Filed: Nov. 23, 2021

(65) Prior Publication Data

US 2022/0191324 A1    Jun. 16, 2022

Related U.S. Application Data

(63) Continuation of application No. 16/691,597, filed on Nov. 21, 2019, now Pat. No. 11,184,480, which is a (Continued)

(30) Foreign Application Priority Data

Oct. 9, 2018   (CA) ................................ CA 3020143

(51) Int. Cl.
*H04M 3/436*   (2006.01)
*H04M 1/56*    (2006.01)
*H04M 3/42*    (2006.01)

(52) U.S. Cl.
CPC ....... *H04M 3/436* (2013.01); *H04M 3/42059* (2013.01); *H04M 2203/551* (2013.01)

(58) Field of Classification Search
None
See application file for complete search history.

(56) References Cited

U.S. PATENT DOCUMENTS 9,736,300 B2   8/2017  Cook
9,819,797 B2   11/2017 Sharpe
(Continued)

OTHER PUBLICATIONS

XFINITY Brochure, "How to Stop Unsolicited Robocalls to Your Home," downloaded from www.xfinity.com, Mar. 2018, 6 pages.
(Continued)

*Primary Examiner* — Quoc D Tran
(74) *Attorney, Agent, or Firm* — Lowe Graham Jones PLLC

(57) ABSTRACT

A system and method for maintaining a grey list for controlling incoming calls from numbers on a telephone network. Information associated with previous calls received by the telephone is stored in the form of a grey list. The stored information includes an indication of whether each of the previously received calls passed a previous challenge. Based on the stored information, when an incoming call is received, a determination is made whether the incoming call corresponds to a call that passed a previous challenge. The incoming call connected to the telephone if the stored information indicates that the incoming call previously passed a challenge. An action is taken if the stored information does not indicate that the incoming call previously passed the challenge. The action may include blocking the call, allowing the call or providing a current challenge to the call.

18 Claims, 4 Drawing Sheets

Related U.S. Application Data continuation of application No. 16/206,993, filed on Nov. 30, 2018, now Pat. No. 10,523,815.

(56) References Cited

U.S. PATENT DOCUMENTS

| | | | |
|---|---|---|---|
| 10,110,741 B1 | 10/2018 | Cohen et al. | |
| 10,523,815 B1* | 12/2019 | Bidulock | H04M 3/436 |
| 11,184,480 B2* | 11/2021 | Bidulock | H04M 3/42059 |
| 2001/0050984 A1 | 12/2001 | Jordan | |
| 2005/0020289 A1 | 1/2005 | Kim | |
| 2007/0283006 A1 | 12/2007 | Hong | |
| 2008/0084975 A1* | 4/2008 | Schwartz | H04M 3/436 379/88.22 |
| 2008/0226047 A1 | 9/2008 | Reumann et al. | |
| 2008/0268883 A1 | 10/2008 | Shim | |
| 2008/0292077 A1 | 11/2008 | Vinokurov et al. | |
| 2009/0307320 A1 | 12/2009 | Golan et al. | |
| 2010/0226261 A1 | 9/2010 | Piche | |
| 2011/0170680 A1* | 7/2011 | Chislett | H04L 65/1079 379/142.06 |
| 2014/0286484 A1* | 9/2014 | Ehrlich | H04M 3/436 379/142.06 |
| 2016/0150414 A1 | 5/2016 | Flaks et al. | |
| 2016/0323446 A1 | 11/2016 | Farrand et al. | |
| 2016/0360036 A1 | 12/2016 | Ansari | |

OTHER PUBLICATIONS

Klein, Daniel V. and Jackson, Dean K., "Fic Robocall Challenge Submission: Crowd-Sourced Call Identification and Suppression," 2013, 15 pages.

"Detect and block spam phone calls with third-party apps," downloaded from www.support.apple.com, Mar. 2018, 3 pages.

* cited by examiner

SYSTEM AND METHOD FOR LIMITING INCOMING SPAM CALLS

PRIORITY CLAIM

This application is a continuation of U.S. patent application Ser. No. 16/691,597 filed Nov. 21, 2019, which is a continuation of U.S. patent application Ser. No. 16/206,993 filed Nov. 30, 2018 (now U.S. Pat. No. 10,523,815), which claims the benefit of priority from Canada Patent Application No. 3020143 filed Oct. 9, 2018, the contents of which applications are incorporated herein by reference in their entireties.

FIELD OF THE INVENTION

The disclosed systems and methods relate to controlling incoming calls received from a telephone network.

BACKGROUND OF THE INVENTION

Unsolicited or other spam calls to telephones can be annoying to a subscriber who receives the calls. Unsolicited calls may be made from parties, organizations or campaigns with which the subscriber has no prior relationship. These calls can be made by robocallers even if such calls are prohibited by local telecommunication rules. In some cases, unwelcomed calls may be made to attempt to sell a product or otherwise solicit money from a subscriber. In more nefarious cases, an illegal attempt may be made to defraud the subscriber of money or property.

There are a few different general types of spam calls. Robocalls are machine generated calls that play announcements and may connect to live agents if the subscriber presses a digit. Push dialers are telemarketing campaigns that utilize predictive dialers. Live agents exist in some circumstances but are almost never used in large scale.

Robocalls are machine generated calls that typically just play a message. Sometimes there is an option provided to connect to a live agent. Robocalls often call from numbers with spoofed calling line identification (CLID) from an unreputable carrier or a hacked operator services trunk. Often random numbers are used within the North American Numbering Plan (NANP). Sometimes a fake national or international number is used. Sometimes an invalid number may be used. A large volume of calls may be sent to one NPA-NXX. The CLID is typically never the same on each call to avoid detection. These spam calls often do not leave a message on voice mail to avoid later detection. The spam calls often wait for a human answer, such as detecting the spoken word "hello" followed by silence. The spam call often can also detect standard voice-mail tones or non-silent periods that are longer than "hello". Often robocalls have no live agent and just have a machine generating the call and playing the announcements. Sometimes there is an option provided to the subscriber recipient of the call to press a digit and speak to a live agent. There is often limited, if any, voice recognition made by the robocall. The robocalls often do not use voice mail message fingerprinting. Robocalls often use similar predictive dialing techniques to push dialers.

Spam push dialers are similar to robocalls in a number of ways. However, rather than being nearly entirely machine generated calls that typically leave a message, push dialers have machine generated calls that only connect to available agents once a human answer is detected. No live agent is connected until after a human answer is detected. Unlike most robocalls, push dialers may use voice mail message fingerprinting.

Current attempts to deal with spam blocking include do not call lists. However, nationally maintained telemarketing do not call lists only avoid cold calls from telemarketers that play by the rules. CLID blocking may be used, but only works on spam calls that block CLD. Caller reveal may also be employed, but only works on spam calls that block CLD or provide invalid CLID. Some telephone users may activate a Do Not Disturb (DND) mode, but it generally would only suppress calls during given periods or when requiring access codes. Using a DND system may be difficult to manage due to its complexity.

Other attempts to deal with spam calls include attempting to control incoming calls received on a network by requiring a challenge for the spam caller, but these systems have drawbacks. In some previous attempts, a challenge is sent to an incoming call, but no information obtained from the challenge is stored in the system. In such a system, the challenge process will need to be repeated each time a new call is received, which can be irritating for legitimate callers who will be subjected to repeated challenges each time they attempt to call.

SUMMARY OF THE INVENTION

There is provided in one embodiment a method of controlling calls received by a telephone connected to a telephone network. Information associated with previous calls received by the telephone is stored and the stored information includes an indication of whether each of the previously received calls passed a previous challenge. Based on the stored information, when an incoming call is received, a determination is made whether the incoming call corresponds to one of the previously received calls that passed a previous challenge. The incoming call is allowed to connect to the telephone if the stored information indicates that the incoming call corresponds to a previously received call that passed a previous challenge. An action is taken if the stored information does not indicate that the incoming call corresponds to a previously received call that passed the previous challenge.

In a further embodiment, there is provided a system for controlling calls to a telephone on a telephone network. There is a network exchange configured to receive an incoming call from the telephone network. There is a call control processor configured to receive information relating to the incoming call from the network exchange. The processor is further configured to compare information relating to the incoming call with stored information on a server. The stored information includes an indication of whether each of the previously received calls passed a previous challenge. The processor is further configured to instruct the network exchange to connect the incoming call to the telephone when the stored information indicates that the incoming call corresponds to a previously received call that passed a previous challenge.

In yet a further embodiment there is a call control unit for controlling calls received on a telephone network. A processor is configured to receive information relating to an incoming call received by the telephone network. The incoming call requests a connection be made to a telephone on the telephone network. A server is configured to store information associated with previous calls received by the telephone. The stored information includes an indication of whether each of the previously received calls passed a previous challenge. The processor is configured to retrieve and update information on the server. The processor is configured to instruct the network exchange to connect the incoming call to the telephone when the stored information indicates that the incoming call corresponds to a previously received call that passed a previous challenge.

These and other aspects of the system and method are set out in the claims, which are incorporated here by reference.

BRIEF DESCRIPTION OF THE DRAWINGS

Embodiments will now be described with reference to the figures, in which like reference characters denote like elements, by way of example, and in which.

DETAILED DESCRIPTION OF THE PREFERRED EMBODIMENT

Figure 1:
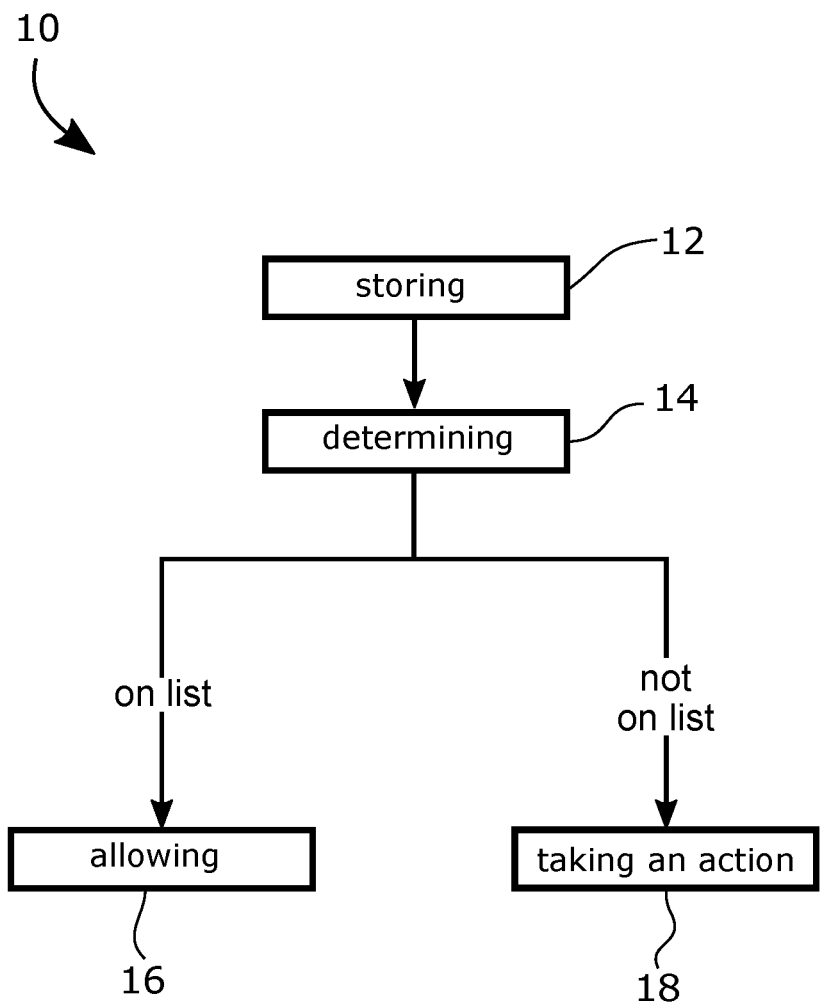
FIG. 1 is a flow diagram showing a method of controlling calls received by a telephone on a telephone network.

In an embodiment shown in FIG. 1 there is a method 10 of controlling calls received by a telephone connected to a telephone network.

At 12, information associated with previous calls received by the telephone is stored, the stored information includes an indication of whether each of the previously received calls passed a previous challenge. This stored information may be described as a grey list. At 14, based on the stored information, when an incoming call is received, a determination is made whether the incoming call corresponds to one of the previously received calls that passed a previous challenge. At 16, the incoming call to is allowed connect to the telephone if the stored information indicates that the incoming call corresponds to a previously received call that passed a previous challenge. At 18, an action is taken if the stored information does not indicate that the incoming call corresponds to a previously received call that passed the previous challenge.

Taking an action in step 18 may further include one of the following: blocking the incoming call, allowing the incoming call to connect to the telephone or sending a current challenge to the incoming call. The determination of which action to take can be set by a subscriber or based on a set of rules set by the system or a combination of both subscriber choice and system evaluation steps.

A user may determine which action to take when the stored information does not indicate that the incoming call corresponds to a previously received call that passed the previous challenge. The user can make this determination by various means, including, for example, selecting a setting through their phone or through a web access to the server containing the user's settings. In some cases, the user may not want to receive any calls from numbers that are not on the grey list. In other cases, the user may wish all calls to be routed through to the user's telephone despite the number not being on the grey list.

In other embodiments, the method may include an evaluation step to determine which action to take based on information about the incoming call. For example, the determination may be made based in part on whether the incoming call is associated with one or more of the following calling line IDs: private, toll free, international, invalid and unknown. For example, as discussed in more detail below, the method may reject incoming calls from, for example, unknown or toll free numbers. The method may also reject all incoming calls with those calling lines IDs. In some cases, as discussed in more detail below, taking the action may mean sending a current challenge to a calling telephone that initiated the incoming call. The method may allow the incoming call to connect to the telephone if the incoming call passes the current challenge. Once the incoming call passes the challenge, the number associated with the incoming call may be added to the grey list by updating the stored information to include an indication that the incoming call passed the current challenge. The current challenge may include a voice prompt that requires a user response. Various challenges can be use to determine that the caller is a human and not an automated system such as a robocall or push dialer. For example, the voice prompt may include a request for the caller to press a key and the user response may be to press the requested key. Other voice prompts and requests could be used, including requesting that the caller say a particular word or phrase or press a sequence of keys. The user response should be simple for a human to execute but should be beyond the programming of most incoming robocalls. To further make it difficult for the robocall to connect to the receiving telephone, the current challenge may also include playing a voicemail tone after the voice prompt. It is common for robocalls to disconnect once they detect a voicemail tone, and so the robocall may disconnect once the voicemail tone is heard. However, a human caller would be expected to realize that the user response can be made after hearing the voice prompt followed by the voicemail tone.

If an incorrect first response is received in response to the current challenge, a second challenge of a voice prompt may be sent to the user. The second challenge may be the same prompt repeated or a new modified challenge for the user. If in response to the second challenge a second incorrect response is received, the incoming call may be blocked. Depending on the preferences of the user or optimisation of the system, the incoming call may instead by sent only one challenge, or may receive multiple chances to pass the challenge.

As discussed in more detail below, depending on whether the incoming call is associated with a number on a blocked caller list or allowed list for the telephone, different actions may be taken. For example, the incoming call may be blocked when the phone number associated with the incoming call corresponds to a number on a blocked caller list for the telephone. The incoming call may be allowed to connect to the telephone when a phone number associated with the incoming call corresponds to a number on an allowed list for the telephone.

The method may also prompt the user of the telephone to add a number to an allowed list for the telephone based on its presence on the grey list. For example, if the telephone has received a number of calls from a number on the grey list, it may suggest to the user that the number be added to the allowed list.

Figure 2:
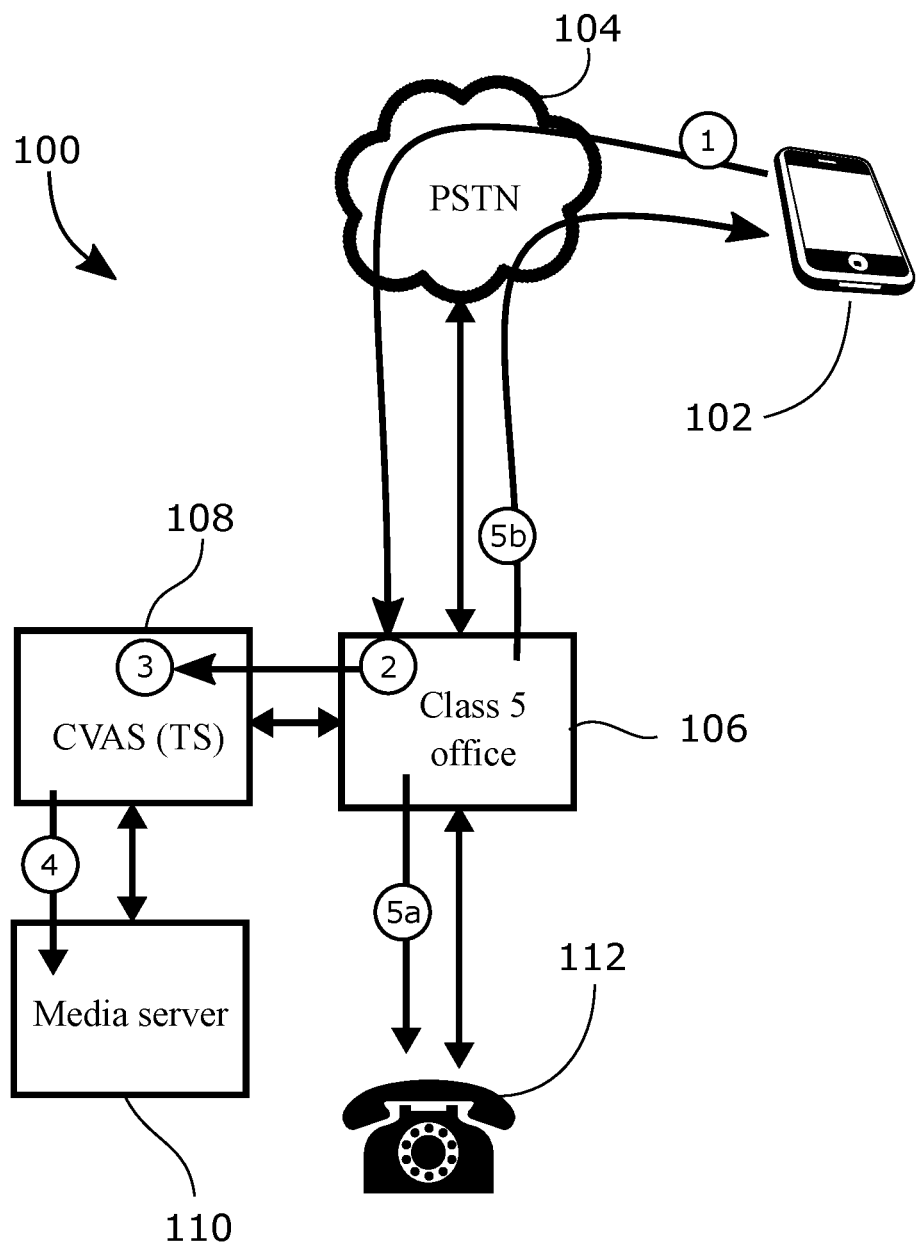
FIG. 2 is a schematic diagram of a system for controlling calls received from a telephone network.

A schematic showing the components in a system 100 for controlling calls on a telephone network 104 is shown in FIG. 2. A network exchange 106 is configured to receive an incoming call from a calling party 102 on the telephone network 104. A call control processor 108 is configured to receive information relating to the incoming call from the network exchange 106. The processor 108 is further configured to compare information relating to the incoming call with stored information on a server. The stored information includes an indication of whether each of the previously received calls passed a previous challenge. The processor 108 is further configured to instruct the network exchange to connect the incoming call to the telephone when the stored information indicates that the incoming call corresponds to a previously received call that passed a previous challenge. The call control processor 108 can be configured to send a current challenge to the calling telephone 102 that initiated the incoming call. The call control processor 108 may be further configured to connect the incoming call to the telephone if the incoming call passes the current challenge. The call control processor 108 may be further configured to update stored information on the server to include an indication that the incoming call passed the challenge.

The telephone network 104 may be a Public Switched Telephone Network (PSTN) 104 switch, and the calling telephone 102 may be connected to the PSTN. Although the system is shown as a PSTN, the systems and methods disclosed may be used in analogous applications on other networks, such as those that include VoIP networks or other networks that may be compatible with or alternatives to standard PSTNs. Although the calling telephone may be described herein as a specific telephone associated with a specific user, the telephone may be operated by a computer and not be associated with a physical conventional telephone. References to the 'user' or 'calling party' or the 'calling telephone' are made for the convenience of the reader and the references are also intended to include calls that may by robocalls, push dialing or other automatic systems that do not use conventional systems or equipment and may not have a human calling party.

The incoming call encounters the call control system provisioned for a called subscriber or called party 112. Once the call is received by the network exchange 106 such as for example, on a class-5 telephone switch in the PSTN, the call is directed to a processor and server such as a converged voice application server (CvAS) 108. The CvAS may contain call control service logic.

After information about the incoming call has been reviewed by the CvAS 108, if the originating call subscriber is on a blocked caller list, the call party either hears an announcement played or is directed to the voicemail of the called party 112. In this case, the call does not complete. If the calling party is on an allowed list, then the call proceeds successfully to the called party 112 through the network exchange 106.

If the calling party is on the grey list and has previously passed a challenge, then the call proceeds successfully to the called party 112 through the network exchange 106.

If the calling party is not any of the lists, then the CvAS 108 may play a current challenge. The CvAS 108 may obtain media from a media server 110. The media may be, for example, a recorded message that states "This number has call control. To get through, please press X". The media server 110 may store a voice prompt and the call control processor 108 is configured to retrieve the voice prompt from the media server 110, and sending a current challenge to the calling telephone may include sending the voice prompt to the calling telephone. Any variation of challenge may be used so long as the message can elicit a specific and detectable response from the originator of the call. If the calling party passes the challenge, then the call is successfully connected to the called party 112. If the calling party fails the challenge, then the call is not connected. The calling party may hear an announcement played that the call has not been connected, or the call is being directed to voicemail, or both.

Figure 3:
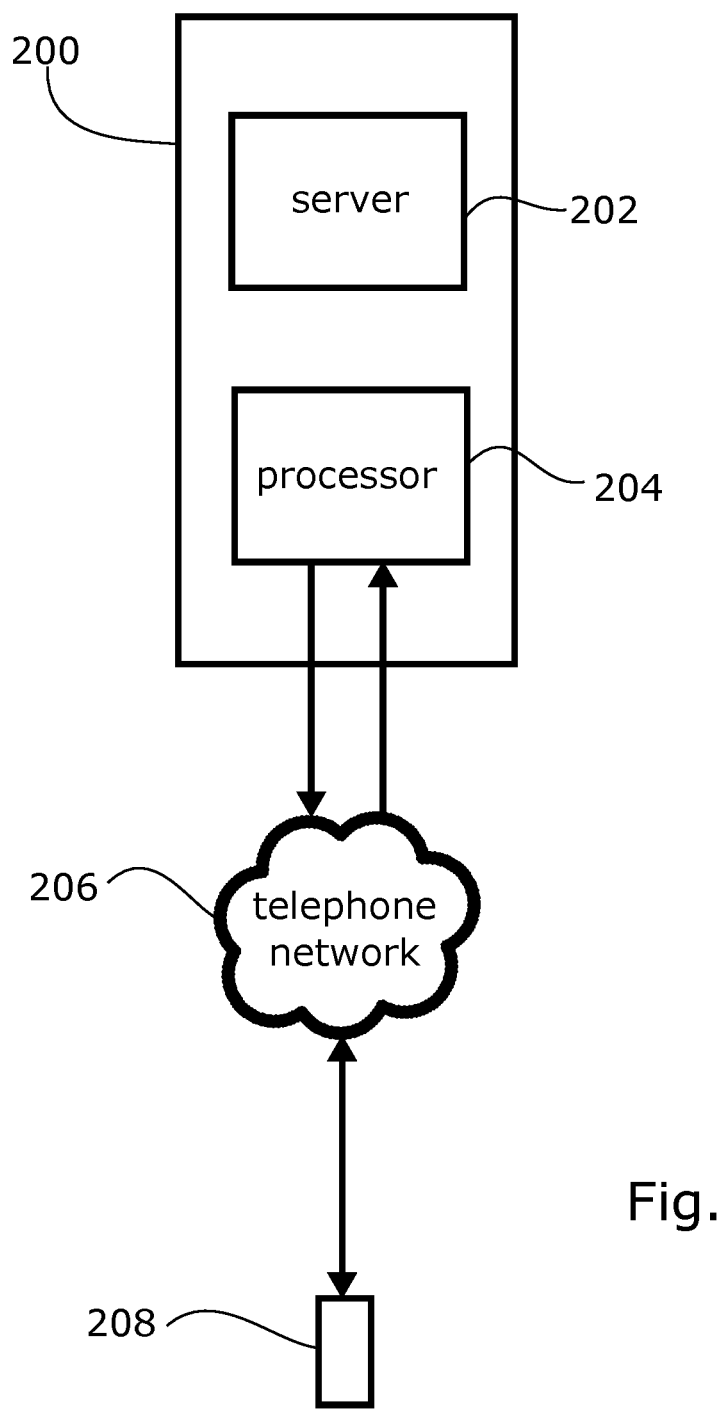
FIG. 3 is a schematic diagram of a call control system.

As shown in FIG. 3, an embodiment of a call control unit 200 for controlling calls received on a telephone network 206 is described in more detail. A processor 204 is configured to receive information relating to an incoming call received by the telephone network 206. The incoming call may request a connection be made to a called telephone 208 on the telephone network 206.

A server 202 is configured to store information associated with previous calls received by the telephone. The stored information may include an indication of whether each of the previously received calls passed a previous challenge. The processor 204 is configured to retrieve and update information on the server 202 and the processor 204 is configured to instruct the network exchange to connect the incoming call to the telephone 208 when the stored information indicates that the incoming call corresponds to a previously received call that passed a previous challenge. The processor 204 may be further configured to send a current challenge to a calling telephone that initiated the incoming call. The processor 204 may be further configured to connect the incoming call to the telephone 208 if the incoming call passes the current challenge. The processor 204 may be further configured to update stored information on the server to include an indication that the incoming call passed the challenge.

Figure 4:
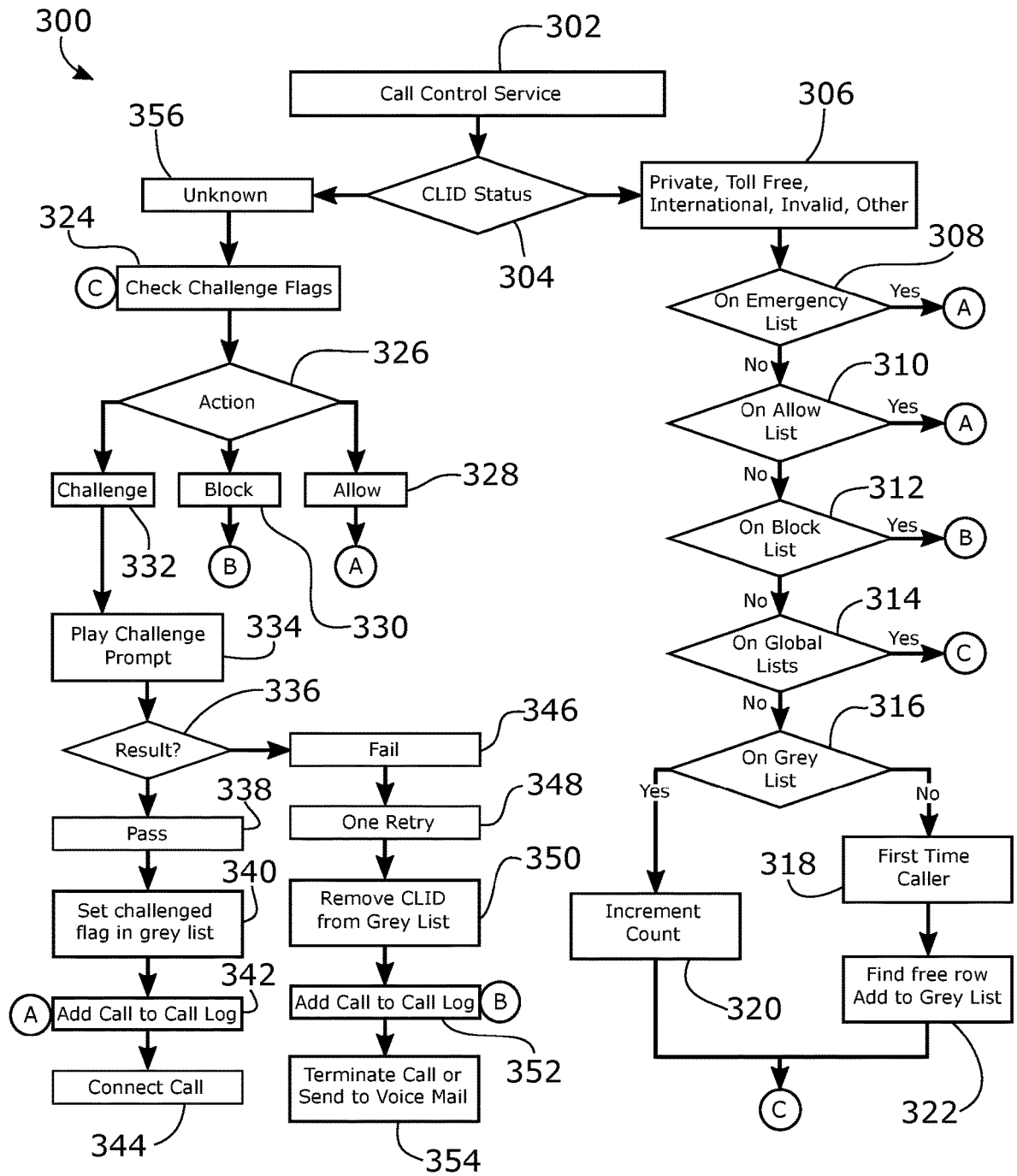
FIG. 4 is a flow diagram showing a method for controlling calls received by a telephone on a telephone network.

One embodiment of a method 300 of controlling calls is shown in more detail in FIG. 4. When a query is sent by a telephone network switch such as a PSTN switch to a processor such as the Converged application Server (CvAS) and the called party is a call control subscriber, then the CvAS will invoke a call control service logic 302. First, at 304 the calling line ID (CLID) may be examined. If the CLID is unknown (blank) as shown at 356, the service 302 checks the challenge flags as described in "C" below. If the CLID is not blank as shown at 306, the service 302 checks if the calling number is on the emergency list at 308 and if so the call will be completed. Next the service 302 checks if the calling number is on the subscriber's allowed callers list at 310 and if so the call will be completed. The service then checks if the calling number is on the subscriber's blocked callers list at 312 and if so the call will be blocked as per "B" below. If the calling number is on a Global accept or block lists at 314 then the call goes to "C" to check the challenge flags as shown at 324.

If the caller was not on any of the above lists, the grey list is checked as shown at 316. The grey list is a list of, for example, the 25 most frequent callers who have previously passed the challenge. In other embodiments, the grey list can include any number of callers who have previously passed a challenge. If the caller is on the grey list, a counter associated with that caller is incremented as shown at 320 and the call goes to "C" to check the challenge flags at 324. If the caller is not on the grey list, the caller is considered a first time caller as shown at 318 and is temporarily added to the grey list as shown at 322 and then the call goes to "C" to check the challenge flags.

At 324, the challenge flags are checked, which is step "C". The subscriber can chose to allow at 328, block at 330 or challenge at 332 callers based on whether the caller is a first time caller, or on the grey list. Other criteria can also be used such as whether the calling number is:
  a. Private
  b. Toll Free
  c. International
  d. Invalid
  e. Unknown
  f. Other If the chosen action is to allow the call at 328, then the call is completed as per "A" at 342. If the chosen action is to block the call at 330, then the caller is blocked as per "B" at 352.

If the chosen action is to challenge the call at 332, then the challenge announcement is played at 334 to the caller using a Media Server. An example challenge could be the following: "This number has Call Control. To get through, please press x", where x is a random digit between 1 and 10. At the end of the challenge announcement a voice mail tone is played. If the caller is a robocaller, the robocaller will assume they have reached the subscribers voice mail and will not complete the call, which will result in the caller failing the challenge at 346. The caller may be given two tries to enter the correct digit. If they fail to enter the correct digit at 346 and fail again after a second attempt at 348, the caller's number is removed from the grey list at 350 and the call is treated as per "B" at 352. If the caller enters the correct digit at 338, the call is treated as per "A" at 342 after the challenge flag is set on the grey list at 340.

At step 352, which is step "B", the call information is recorded in the subscriber's call log at 352 and the caller is played a terminating announcement using the Media Server or sent to the subscriber's voice mail at 354. The decision about which response to provide to a number that is not added to the grey list may be set by the subscriber, depending on the subscriber's previous choice.

At step 342, which is step "A", the call information is recorded in the subscriber's call log and the caller is connected to the subscriber at 344.

In some embodiments, the grey listing service may use CvAS service logic that hangs off of termination-attempt trigger, which is the same as DND mode. It can be invoked prior to DND. The list may maintain a list of the most-recent, most-frequent number of callers indexed by valid CLID. For example, 25 caller may be indexed at a time. Callers with invalid or blocked CLID may be treated as first-time callers and not placed on list. Numbers on the grey list with presentable CLID may be displayed to a customer in DND web interface as suggested numbers for a call allowed list or white list. A DND web interface can permit subscribers to delete callers from the grey list (resetting them to first-time callers). The grey list can be maintained regardless of whether "Call Guard" or DND is activated. The grey list can operate with regular DND service offering. When DND service is active, the call may be passed to regular DND service logic. When DND service is inactive and optional "Call Guard" service is inactive it connects the call as normal. When DND service is inactive and optional "Call Guard" service is active, the call is handled by Call Guard service logic.

When invoked, Call Guard service logic may challenge first-time callers with an announcement (prompt and collect) requesting the caller to input a digit. Announcement can be something like: "The number you have called is not accepting unsolicited calls at this time. Please enter <random digit> after the tone to proceed. <voice mail tone>". <random digit> is a randomly selected number from 0 to 9. <voice mail tone> is the standard voice mail tone or "beep". First-time callers may be defined as:
  a. A caller with an invalid CLID.
  b. A caller with a blocked CLD.
  c. A caller with a valid CLID that is not on the DND white list.
  d. A caller with a valid CLID that was entered on the grey without challenge less than 24 hours ago.

In some cases, subscribers may block invalid CLIDs or Private CLIDs if they choose, and so the service may not automatically treat them as first-time callers. First-time callers with a valid CLID that pass the challenge are added to the grey list. First-time callers that fail the challenge are removed from the grey list. Because there is no live agent to understand the message, unsolicited, CLID-spoofed robocalls should be effectively suppressed. Because there is no live agent until a human answers, CLID-spoofed predictive dialed spam calls should be effectively suppressed. Live agent spam calls will not be suppressed, but the system may collect the necessary information for user reporting. False positives can be corrected by a subscriber adding the number to a DND white list or allowed list. In some embodiments, the system may track and report the number of failed challenges and suppressed calls. User reporting tools may allow service providers to refine the suppression logic by pulling up call traces for calls that failed suppression.

Because service can be implemented in Converged Application Server (CvAS) service logic, all copper subscribers may be covered. For telecommunications companies, implementation on CvAS requires no capital equipment beyond basic DND service. Extension to IP Multimedia Subsystem (IMS) core, such as Voice over Long-Term Evolution (VoLTE) and Next Generation Home Phone (NGHP), is possible using Application Server (AS) from Dialogic.

In order to implement the system and method disclosed, the system may use proof of concept (PoC) with Dialogic to extend termination-attempt trigger from IMS to CvAS. Advanced Intelligent Network (AIN) triggers may be extended from IMS core into CvAS to provide residential AIN services to Home Phone to Go (HP2G). AIN triggers may be extended from IMS core into CvAS to provide business AIN services to IMS-based business services (when Business Voice over Internet Protocol (BVoIP) goes to IMS).

Immaterial modifications may be made to the embodiments described here without departing from what is covered by the claims. For example, each of the processor or server or other systems disclosed may be physical, virtual or cloud-based systems so long as each is capable of implementing the method disclosed. In those cases where the systems are physical, the functionality described for each of the processor or server or other systems may be implemented by a single piece of hardware at a specific location or may make use of multiple systems at separate locations. The processor and server themselves may be provided together on a single piece of hardware or multiple pieces of hardware. The network systems described may be entirely digital or analog or a mixture of the two so long as the necessary connections may be made between telephone users.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privillege is claimed are defined as follows:

1. A method of controlling calls received by a telephone connected to a telephone network, comprising:

determining whether to send a current incoming call from a phone number a current challenge prior to connecting the current incoming call to the telephone based on information related to the phone number including one or more of the following: a) a property of a calling number identification associated with the phone number; b) the presence of the phone number on a white list, a grey list or a blocked caller list; c) stored information indicating whether a previous incoming call from the phone number to the telephone passed a previous challenge; or d) stored information including the frequency and the recentness of previous calls from the phone number;

sending a current challenge to the phone number, the current challenge comprising a request for a user associated with the current incoming call to press a randomly-selected digit or digits and in which the current challenge is passed if the requested randomly-selected digit or digits is pressed; and allowing the current incoming call to connect to the telephone if the current challenge is passed.

2. The method of claim 1 in which the information related to the phone number further comprises an indication of whether the previous incoming call from the phone number to the telephone passed the previous challenge; and the method further comprising allowing the current incoming call to connect to the telephone if the current incoming call corresponds to a previously received call that passed a previous challenge.

3. The method of claim 2 in which a user associated with the telephone determines whether to block, allow or send the current challenge to the current incoming call when the information related to the number associated with the current incoming call does not indicate that the current incoming call corresponds to a previously received call that passed the previous challenge.

4. The method of claim 1 in which the current challenge further comprises playing a voicemail tone after a voice prompt, wherein the voice prompt comprises the request for the caller to press a randomly-selected digit or digits.

5. The method of claim 1 in which the current challenge includes a first challenge and a second challenge, and in which the current incoming call is sent a second challenge if a first incorrect response is received in response to the first challenge.

6. The method of claim 5 further comprising blocking the current incoming call if in response to the second challenge a second incorrect response is received.

7. The method of claim 1 further comprising providing a prompt to a user associated with the telephone to add the phone number to an allowed list for the telephone if the phone number associated with the previous incoming call or the current incoming call passed the previous challenge or the current challenge.

8. The method of claim 1 in which the current incoming call from the phone number is blocked if the calling number identification associated with the phone number is not valid.

9. The method of claim 1 further comprising a storing a grey list and in which first-time callers to the telephone are sent the current challenge and if the phone number associated with the first-time caller passes the current challenge, then the first-time caller is added to the grey list.

10. The method of claim 1 further comprising providing a user associated with the telephone an option to direct incoming calls to voicemail if the phone number fails the current challenge.

11. A system for controlling calls to a telephone on a telephone network, comprising:

a network exchange configured to receive a current incoming call from the telephone network; and a call control processor configured to receive information relating to the current incoming call from the network exchange, the processor further configured to:

determine whether to send the current incoming call from a phone number a current challenge prior to connecting the current incoming call to the telephone based on information related to the phone number including one or more of the following: a) a property of a calling number identification associated with the phone number; b) the presence of the phone number on a white list, a grey list or a black list; c) stored information indicating whether a previous incoming call from the phone number to the telephone passed a previous challenge; or d) stored information including the frequency and the recentness of previous calls from the phone number;

send a current challenge to the phone number, the current challenge comprising a request for a user associated with the current incoming call to press a randomly-selected digit or digits and in which the current challenge is passed if the requested randomly-selected digit or digits is pressed; and allow the current incoming call to connect to the telephone if the current challenge is passed.

12. The system of claim 11 in which the call control processor is further configured to store a grey list and in which first-time callers to the telephone are sent the current challenge and if the phone number associated with the first-time caller passes the current challenge, then the first-time caller is added to the grey list.

13. The system of claim 11 further comprising a media server connected to the call control processor, the media server storing a voice prompt and the call control processor being further configured to retrieve the voice prompt from the media server, and in which sending a current challenge to the telephone further comprises sending the voice prompt to the telephone.

14. The system of claim 13 in which the call control processor is further configured to play the voice prompt followed by a voicemail tone to the user associated with the phone number, wherein the voice prompt comprises the request for the user associated with the phone number to press a randomly-selected digit or digits.

15. A call control unit for controlling calls received on a telephone network, comprising:

a processor configured to receive information relating to a current incoming call associated with a phone number received by the telephone network, the current incoming call requesting a connection be made to a telephone on the telephone network;

a server configured to store information related to the phone number including one or more of the following: a) a property of a calling number identification associated with the phone number; b) the presence of the phone number on a white list, a grey list or a black list; c) stored information indicating whether a previous incoming call from the phone number to the telephone passed a previous challenge; or d) stored information including the frequency and the recentness with previous calls from the phone number; and the processor being configured to:
   determine whether to send a current incoming call from a phone number a current challenge prior to connecting the current incoming call to the telephone based on the information stored on the server related to the phone number;
   send a current challenge to the phone number, the current challenge comprising a request for a user associated with the phone number to press a randomly-selected digit or digits and in which the current challenge is passed if the requested randomly-selected digit or digits is pressed; and
   allow the current incoming call to connect to the telephone if the current challenge is passed.

16. The call control unit of claim 15 in which the processor is further configured to store a grey list and in which first-time callers to the telephone are sent the current challenge and if the phone number associated with the first-time caller passes the current challenge, then the first-time caller is added to the grey list.

17. The call control unit of claim 15 further comprising a media server connected to the processor, the media server storing a voice prompt and the processor being further configured to retrieve the voice prompt from the media server, and in which sending the current challenge to the telephone further comprises sending the voice prompt to the telephone.

18. The call control unit of claim 17 in which the call control processor is further configured to play the voice prompt followed by a voicemail tone to a user associated with the phone number, wherein the voice prompt comprises the request for the caller to press a randomly-selected digit or digits.

* * * * *